United States Patent
Kim et al.

(10) Patent No.: US 7,627,044 B2
(45) Date of Patent: Dec. 1, 2009

(54) CLOCK-EDGE MODULATED SERIAL LINK WITH DC-BALANCE CONTROL

(75) Inventors: Gyudong Kim, Sunnyvale, CA (US); Won Jun Choe, Seoul (KR); Deog-Kyoon Jeong, Seoul (KR); Jaeha Kim, Mountain View, CA (US); Bong-Joon Lee, Seoul (KR); Min-Kyu Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 605 days.

(21) Appl. No.: 11/264,303

(22) Filed: Oct. 31, 2005

(65) Prior Publication Data

US 2007/0098112 A1 May 3, 2007

(51) Int. Cl.
*H04B 3/00* (2006.01)
(52) U.S. Cl. ...................................... 375/257
(58) Field of Classification Search .................. 375/257, 375/259, 260, 295, 316, 319; 324/98; 455/453, 455/284, 305; 718/105; 370/284, 301
See application file for complete search history.

(56) References Cited

U.S. PATENT DOCUMENTS

| 6,463,092 | B1  |     | 10/2002 | Kim et al. |     |
|-----------|-----|-----|---------|------------|-----|
| 7,356,051 | B2  | *   | 4/2008  | Pasqualino et al. | 370/490 |
| 7,363,575 | B2  | *   | 4/2008  | Chung      | 714/759 |
| 2004/0088633 | A1 | * | 5/2004  | Lida et al. | 714/752 |
| 2004/0158873 | A1 | * | 8/2004  | Pasqualino | 725/131 |
| 2005/0286643 | A1 | * | 12/2005 | Ozawa et al. | 375/242 |

OTHER PUBLICATIONS

Kyeongho Lee, et al., "1.04 GBd Low EMI Digital Video Interface System Using Small Serial Link Technique," *IEEE Journal of Solid-State Circuits*, vol. 33, No. 5, May 1998, pp. 816-823.
Wei-Hung Chen, et al., "A CMOS 400-Mb/s Serial Link for AS-Memory Systems Using a PWM Scheme," *IEEE Journal of Solid-State Circuits*, vol. 36, No. 10, Oct. 2001, pp. 1498-1505.

* cited by examiner

*Primary Examiner*—Sam K Ahn
(74) *Attorney, Agent, or Firm*—Blakely Sokoloff Taylor & Zafman

(57) ABSTRACT

A battery powered computing device has a channel configured as a single direct current balanced differential channel. A signal transmitter is connected to the channel. The signal transmitter is configured to apply clock edge modulated signals to the channel, where the clock edge modulated signals include direct current balancing control signals. A signal receiver is connected to the channel. The signal receiver is configured to recover the direct current balancing control signals.

19 Claims, 8 Drawing Sheets

CLOCK-EDGE MODULATED SERIAL LINK WITH DC-BALANCE CONTROL

BRIEF DESCRIPTION OF THE INVENTION

This invention relates generally to the transmission of serial signals, such as in a transition minimized differential signaling system. More particularly, this invention relates to a clock-edge modulated serial link incorporating direct current (DC) balancing control signals.

BACKGROUND OF THE INVENTION

Mobile devices, such as cellular phones, Personal Digital Assistants (PDAs) and portable game consoles continue to grow in popularity. FIG. 1 illustrates an example of such a mobile device. In particular, FIG. 1 illustrates a mobile device 100 connected to a mobile display 102 via an interface 104. The mobile device 100 includes a central processing unit 106 and a graphic controller 108. The mobile display 102 includes a display controller 110 and a display 112, such as a liquid crystal display. A battery 114 powers the mobile device 100 and the mobile display 102. Low power design is critical in mobile applications of this type.

A conventional mobile device interface 104 uses parallel channels with single-ended full-swing signaling. The channels are composed of many lines, for example, 22 lines with 18-bit video pixel data lines and control signal lines, such as dot-clock, data enable (DE), horizontal sync (HSYNC), vertical sync (VSYNC), and other display-specific configuration settings. These signal lines consume power and space. In addition, they produce excessive electromagnetic radiation. To reduce the number of lines, a serial link with low-voltage swing differential signaling may be used. As known in the art, this type of signaling amplifies difference signals, while rejecting common-mode signals.

Popular display interfaces, such as Low Voltage Differential Signaling (LVDS) and Digital Visual Interface (DVI) use 3 channels of serialized differential signals for 18-bit or 24-bit pixel color data. In addition, a separate channel is used for clock transmission. In such an application, the voltage swing is reduced to about 400 mV.

In certain applications, such as a mobile display, relatively low video resolution is acceptable. In such a case, it is possible to use a single data channel. However, in this situation, the prior art has relied upon a separate clock channel. Since the dedicated channel solely for clock transmission increases hardware costs and power, it would be desirable to remove the dedicated clock channel and use only a single channel for transmitting the clock, data and control signals. However, if conventional network protocols, such as 802.3z Gigabit Ethernet are employed, a number of problems arise. For example, a local reference clock must be used at the receiver. This increases hardware costs and reduces flexibility in transmission bandwidth.

In view of the foregoing, it would be desirable to provide a low-power mobile device with a serial channel that supports clock, data and control signals, such as DC balancing control signals.

SUMMARY OF THE INVENTION

The invention includes a battery powered computing device with a channel configured as a single direct current balanced differential channel. A signal transmitter is connected to the channel. The signal transmitter is configured to apply clock edge modulated signals to the channel, where the clock edge modulated signals include direct current balancing control signals. A signal receiver is connected to the channel. The signal receiver is configured to recover the direct current balancing control signals.

The invention includes a signal transmitter. The signal transmitter has a channel node to interface with a single direct current balanced differential channel. Circuitry is connected to the channel node, the circuitry being configured to multiplex clock, data and control signals and apply them to the channel node. The clock signal is pulse width modulated to incorporate direct current balancing control signals.

The invention also includes a signal receiver. A channel node interfaces with a channel configured as a single direct current balanced differential channel. Circuitry is connected to the channel node. The circuitry is configured to de-multiplex clock, data and control signals from the channel node. The circuitry identifies direct current balancing control signals within a pulse width modulate clock signal.

The invention allows many parallel channels to be reduced to a single serial channel, which reduces power consumption. To further reduce power dissipation, the invention may be implemented with voltage-mode drivers. Still additional power reduction can be achieved by removing the source transmission channel termination and relying solely upon receiver side source transmission channel termination. The invention includes a delay-locked loop (DLL) data-recovery circuit that operates robustly in a high jitter environment.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention includes a single-channel serial link using clock edge modulation (CEM). This scheme, also known as pulse-width modulation (PWM), encodes data information onto a periodic clock by varying the position of a selected edge (i.e., the rising edge or falling edge); thus, the pulse-width of the clock is altered or modulated. The invention provides techniques to transfer a clock signal, data and control signals over a single channel.

Figure 1:
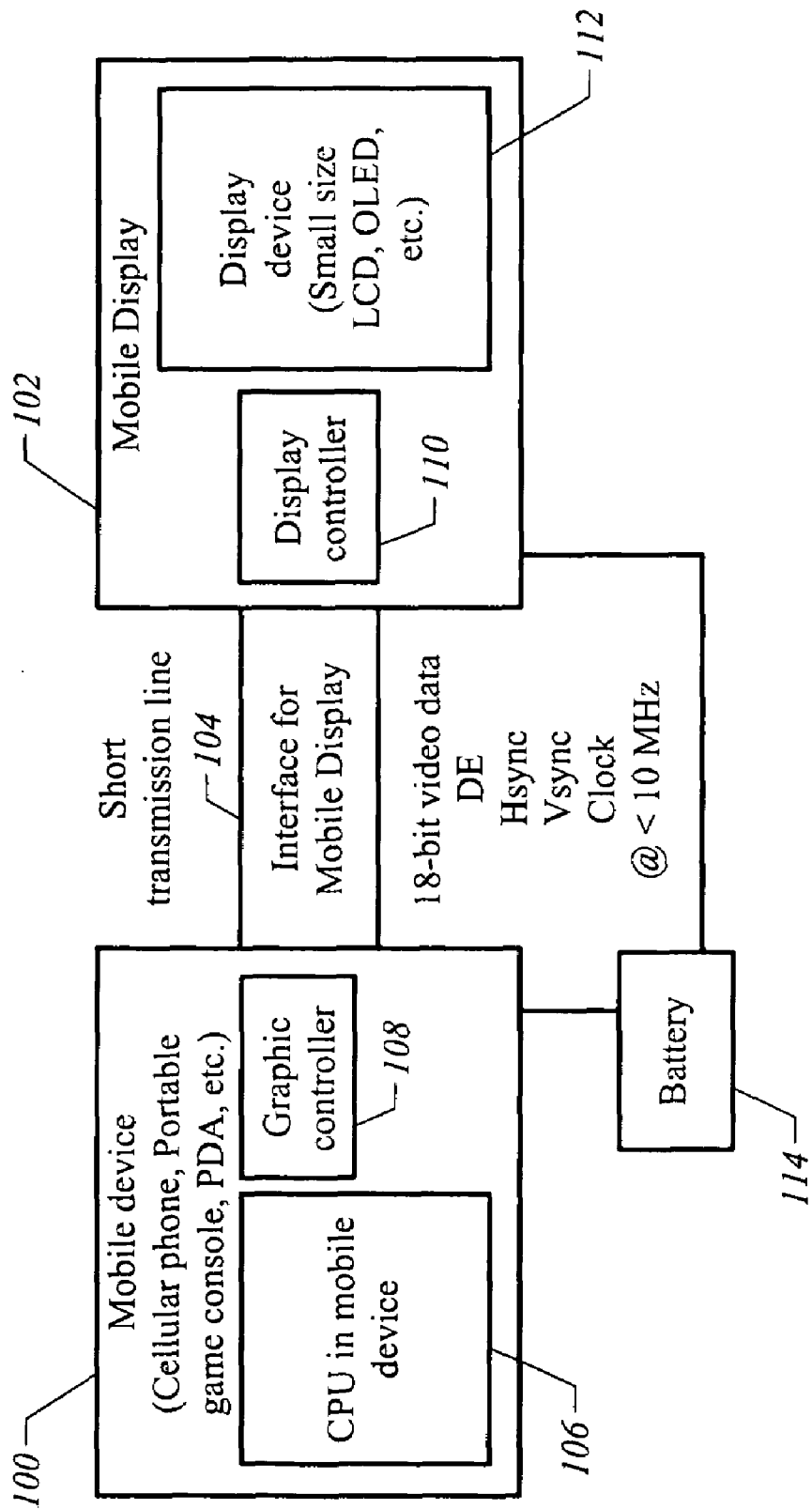
FIG. 1 illustrates a mobile device and a mobile display that may be configured in accordance with an embodiment of the invention.
Figure 2A:
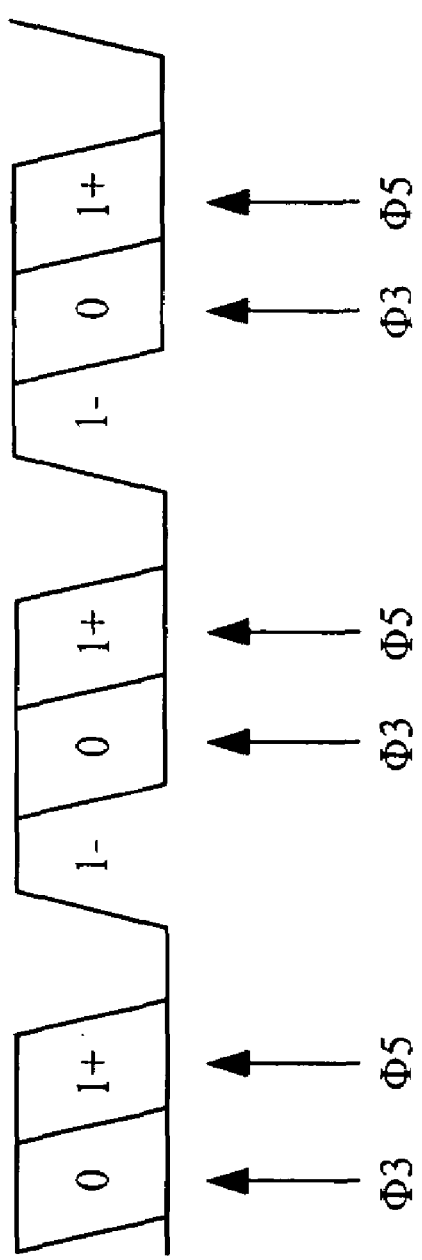
FIG. 2A illustrates DC-balanced clock-edge modulation in accordance with an embodiment of the invention.

By way of example, the invention may be implemented by varying the falling edge of the clock signal. As shown in FIG. 2A, data are encoded as a variation of the clock falling edge position, while the position of the rising edge is fixed. The periodic occurrence of the rising edges enables easy extraction of the clock signal, from which the receiver can generate the "dot-clock" simply by dividing down the incoming signal (e.g., by 18) with no further clock recovery mechanism. The modulation of the falling edge position or the clock pulse width allows one to embed data and control signals in the clock, therefore reducing the pin count.

U.S. Pat. No. 6,463,092 (the '092 patent) utilizes a pulse width modulation technique of this type. The '092 patent, which is assigned to the assignee of the current invention, is hereby incorporated by reference. The current invention builds upon the disclosed scheme of the '092 patent to achieve DC-balancing. In one embodiment, DC-balancing is achieved by inserting DC-balancing control signals into the serial link. The DC-balancing control signals may include signals to maintain DC-balance, increase DC-balance, and decrease DC-balance. Standard techniques are used to generate and process the DC-balance control signals. An aspect of the invention is directed toward incorporating the DC-balance control signals into a single serial link along with clock and data signals.

In one embodiment of the invention, the bit "0" is coded as a 50% duty cycle clock, indicating that no changes are necessary to keep balance. On the other hand, the bit "1" is coded as either a 25% or a 75% duty cycle clock, denoted as "1−" and "1+", respectively, in FIG. 2(a). Whether to use a 25% or a 75% duty cycle is determined by the DC value of the bits transmitted so far. If the DC value is lower than nominal, the bit "1" is coded as 75%, and vice versa. With this encoding, the maximum disparity counted in unit pulse length (i.e., 25% pulse width) is only 2 and good DC-balance is achieved.

Figure 2B:
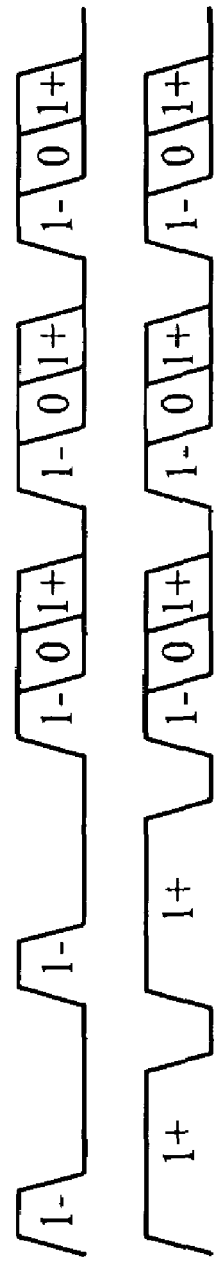
FIG. 2B illustrates special character embedded clock-edge modulation utilized in accordance with an embodiment of the invention.

The serial link may also be used to transmit control signals, such as HSYNC and VSYNC. In one embodiment, these control signals are transmitted when DE is unasserted. Leveraging this fact, the state of DE being 0 is coded as two consecutive "1+"s or "1−"s, as shown in FIG. 2(b), which is an impossible sequence while the normal pixel data are being sent (i.e., DE is 1). This special sequence indicates that the following 16 pulse-width modulated symbols represent control characters. In this way, the control signals can be transmitted without requiring any additional channels. That is, the invention leverages the DE 0 state (when data is not being sent) to send DC-balance and other control information on a single channel.

Figure 3:
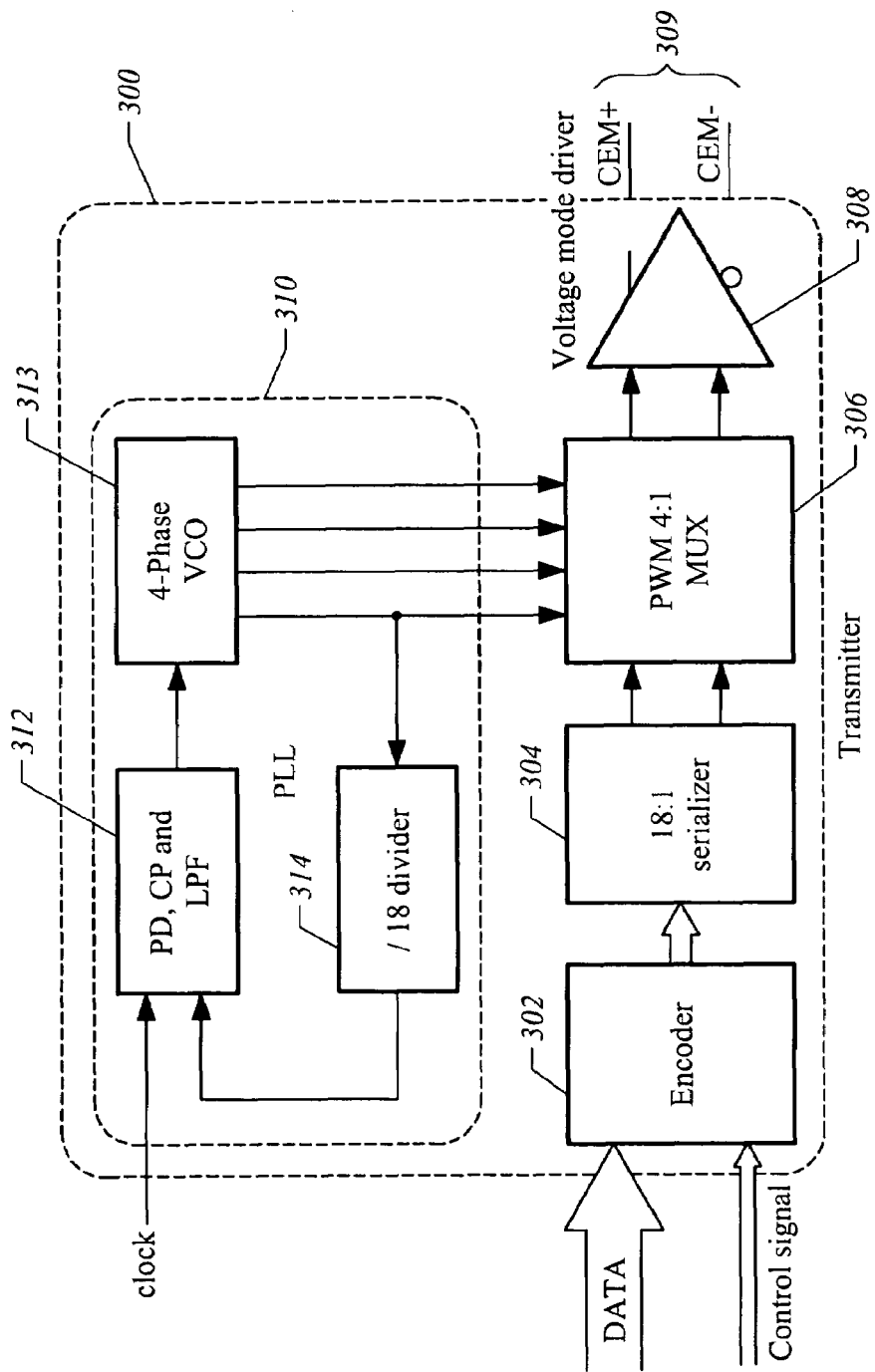
FIG. 3 illustrates a clock-edge modulated transmitter configured in accordance with an embodiment of the invention.

FIG. 3 illustrates a transmitter 300 configured in accordance with an embodiment of the invention. The transmitter 300 includes an encoder 302 that receives data and control signals. For example, the data may be 6 bits of red pixel data, 6 bits of green pixel data, and 6 bits of blue pixel data. The control signals may include HSYNC, VSYNC, and DE signals. The output of the encoder 302 is applied to a serializer circuit 304, which serializes the data and control information for the serial link. The encoder 302 or the serializer circuit 304 may be used to generate a DC-balance control signal.

The serialized data is then applied to a multiplexer, which receives control inputs form a phase-locked loop 310. The output of the multiplexer 306 is applied to a channel driver 308, in this case a voltage mode driver, which produces differential clock-edge modulated signals. In particular, the channel driver 308 applies a positive CEM signal (CEM+) and a negative CEM signal (CEM−) to a channel node 309.

In one embodiment, the phase detector 312 of the phase-locked loop 310 multiplies the reference clock by 18 and operates with a voltage controlled oscillator 313 to generate 4 clock phases: 0(φ0), 90(φ1), 180(φ2), and 270(φ3). A divider 314 divides the multiplied clock signal and provides a feedback input to the phase detector 312. The transmitter operates as if it is sending 4 Non-Return to Zero (NRZ) bits per symbol using these clock phases. The phase signals are processed by the multiplexer 306.

Figure 4:
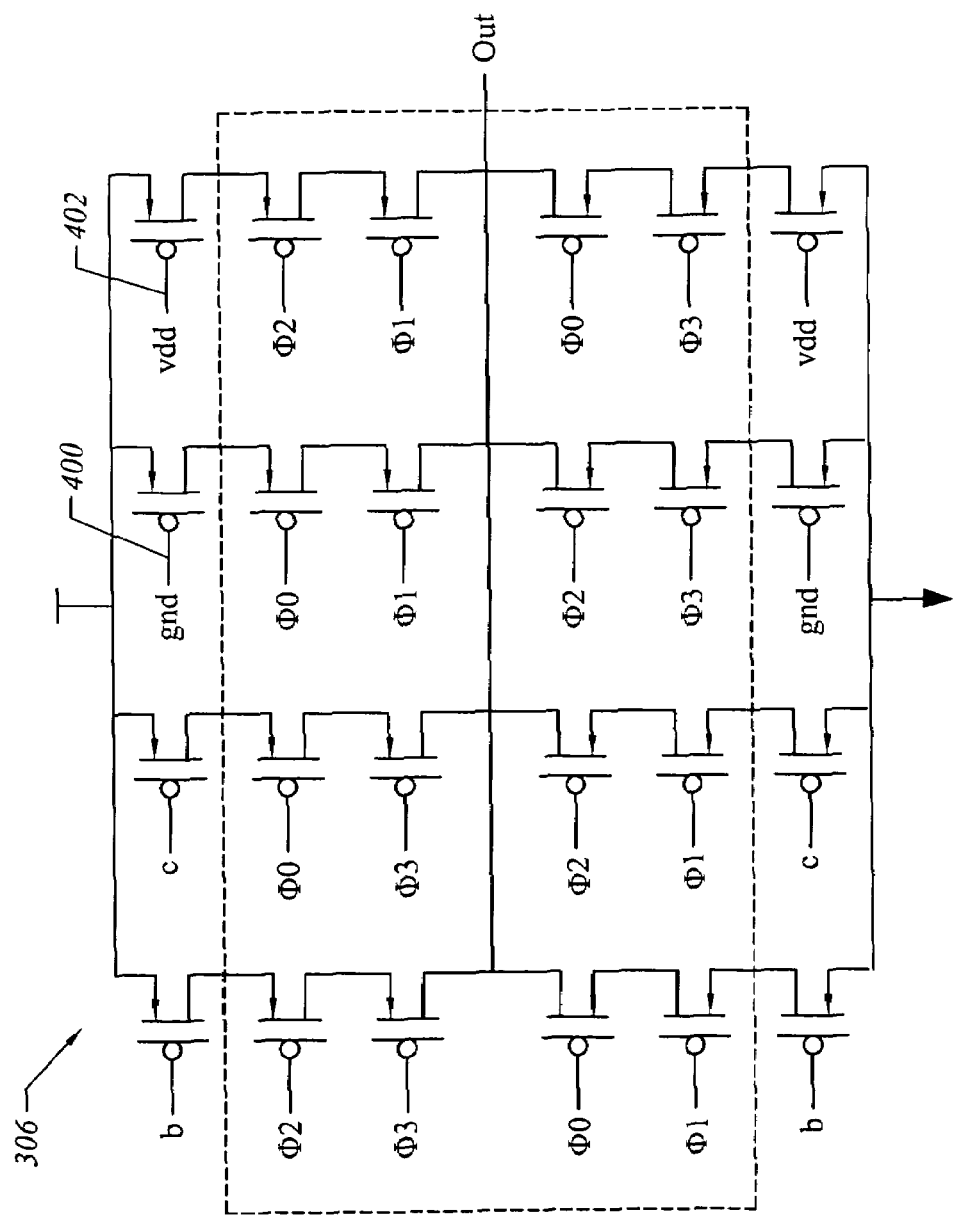
FIG. 4 illustrates a multiplexer that may be used in the clock-edge modulated transmitter of FIG. 3.

FIG. 4 illustrates a pulse width modulated 4-to-1 multiplexer configured in accordance with an embodiment of the invention. Note that the first bit 400 and the last bit 402 are fixed at 1 and 0, respectively. Only the middle two bits (b and c in FIG. 4) need to vary to express the three different falling edge positions. The encoder 302 and serializer 304 may be used to generate these two bits from the parallel pixel data and control signals.

Figure 5:
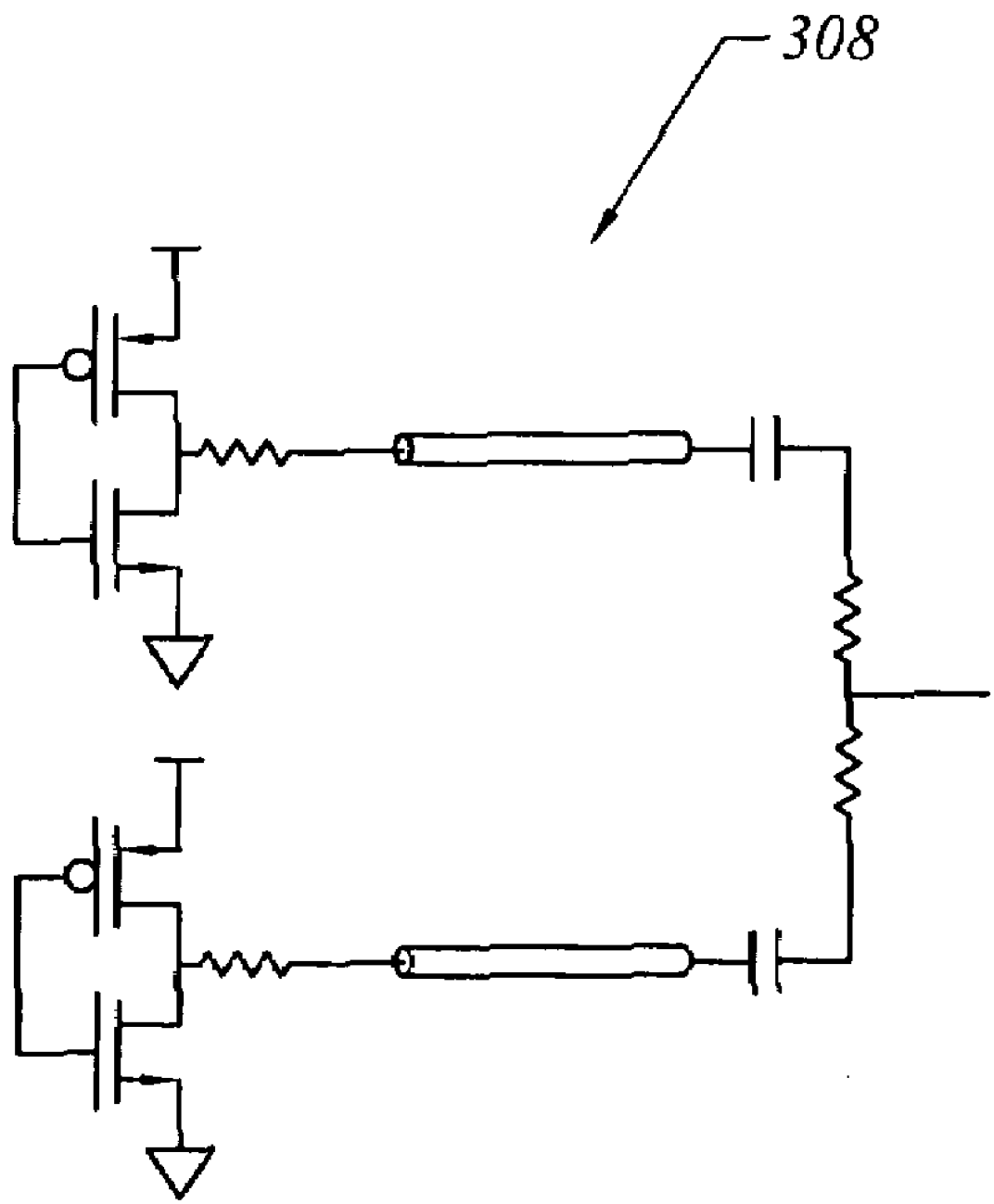
FIG. 5 illustrates a voltage mode driver utilized in accordance with an embodiment of the invention.

Since power consumption is a significant concern in a mobile device, an embodiment of the invention uses a voltage mode driver 308 for off-chip signaling in the CEM transmitter. FIG. 5 illustrates a known voltage mode driver that may be used in accordance with an embodiment of the invention. Unlike other prior art drivers, the voltage mode driver does not have a current source stack, hence it is capable of low voltage operation. To reduce the power consumption, the voltage mode driver is designed to operate at 1.2V supply and the voltage swing is also reduced to 80 mV. Since the link span of the mobile display is short (less than several inches) and the CEM signal is relatively immune to inter-symbol interference, an 80 mV swing is enough to guarantee proper operation of the receiver. Using the voltage mode driver with reduced swing, the CEM transmitter has been implemented to consume less than 1 mW when operating at 270 Mbps.

For the proposed CEM link, the data is delivered on the clock signal, making the receiver architecture much simpler. That is, the receiver does not require an NRZ phase detector nor a local frequency reference, as is the case in many serial link receivers. In one embodiment, the invention uses a delay locked loop (DLL) for data recovery, as shown in FIG. 6.

The receiver 600 has a front-end limiting amplifier 602 which receives differential input signals CEM+ and CEM− at channel node 603. The amplifier 602 facilitates an adequate signal level for the DLL input. A voltage-controlled delay line (VCDL) 604 generates 8-phase delayed clocks to sample and decode the CEM data. FIG. 2(a) shows a timing relationship between sampling clocks and input CEM data. In one embodiment, the sampler 606 examines the CEM data at two different phases (φ3 and φ5, as shown in FIG. 2A) to identify the location of the clock falling edge.

Figure 7:
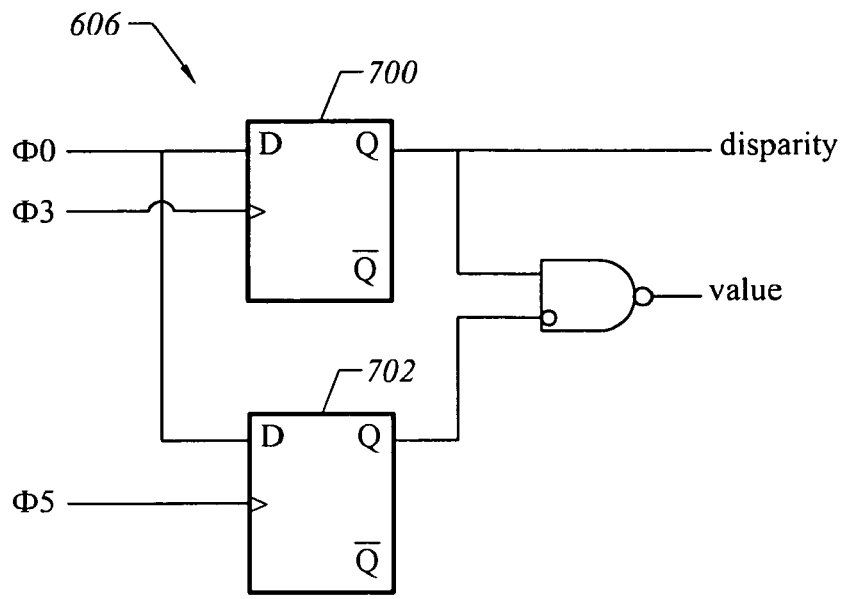
FIG. 7 illustrates clock-edge modulated decoder that may be used in accordance with an embodiment of the invention.

FIG. 7 illustrates a sampler and pulse-width modulated decoder 606 implemented with two flip-flops 700 and 702. Each flip-flop receives the φ0 signal, while flip flop 700 receives the φ3 signal and flip flop 702 receives the φ5 signal. Using the sampled results, the CEM decoder extracts the data and disparity information. From the disparity information, the receiver can detect the pixel boundary and special sequences indicating DE, HSYNC, and VSYNC.

Figure 6:
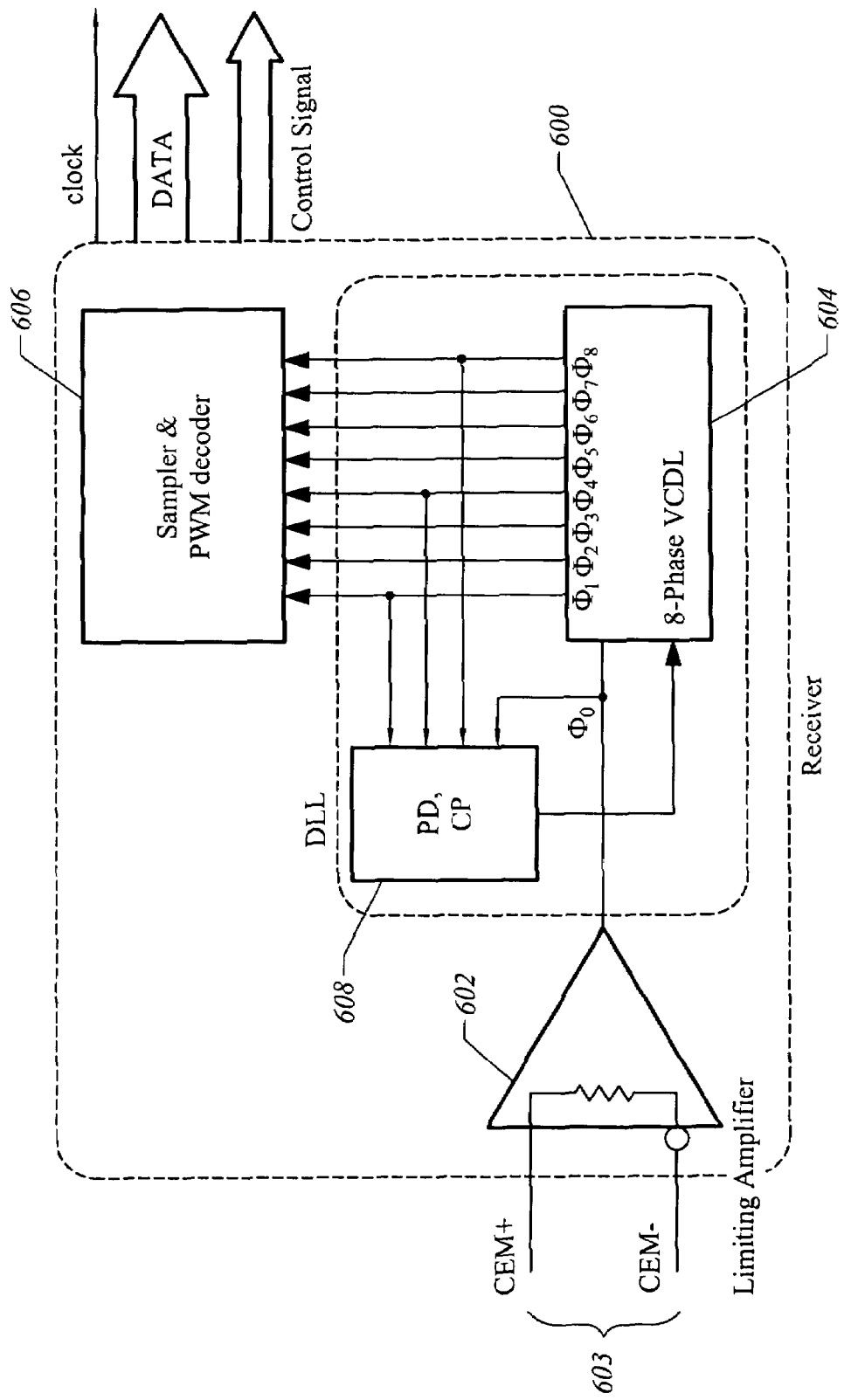
FIG. 6 illustrates a clock-edge modulated receiver configured in accordance with an embodiment of the invention.
Figure 8A:
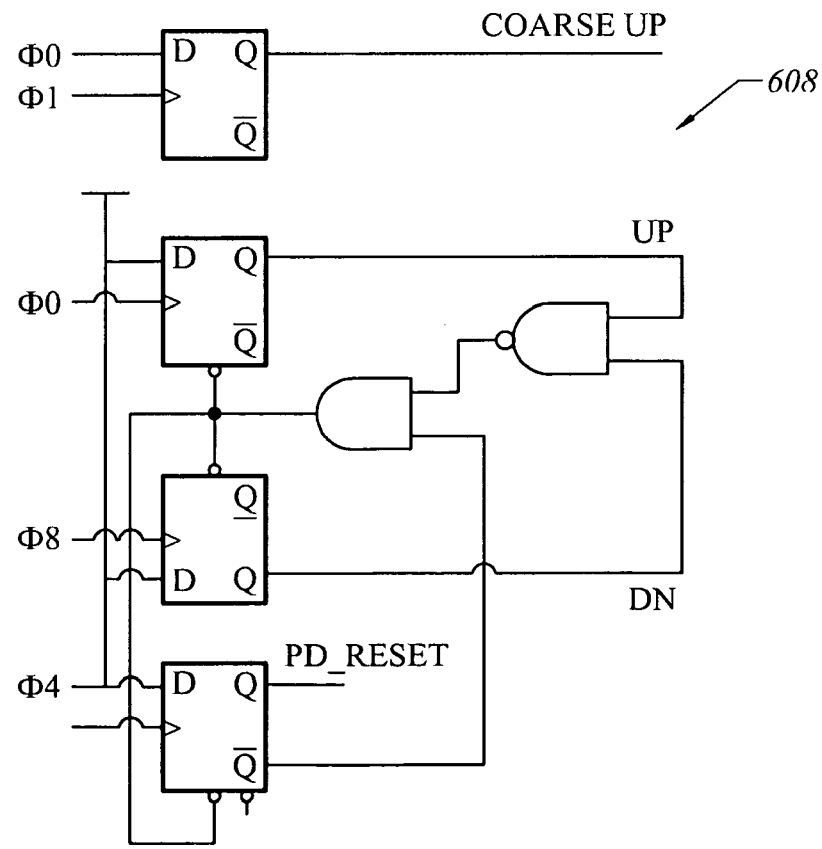
FIG. 8A illustrates a phase detector circuit configured in accordance with an embodiment of the invention.
Figure 8B:
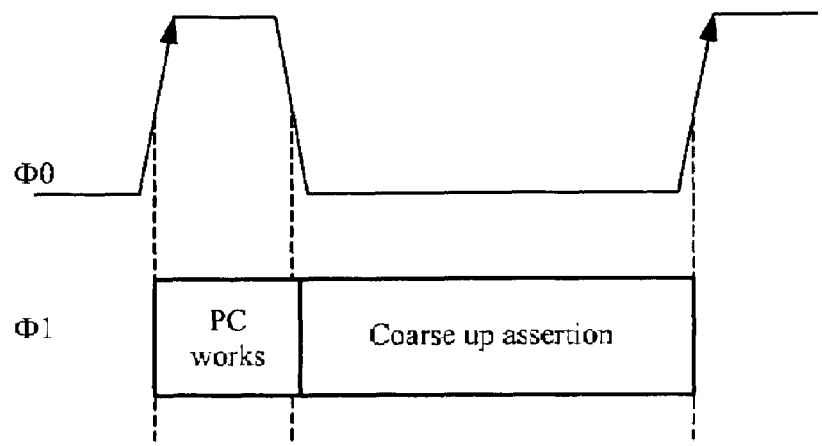
FIG. 8B illustrates the use of a coarse-up signal in accordance with an embodiment of the invention.
Figure 8C:
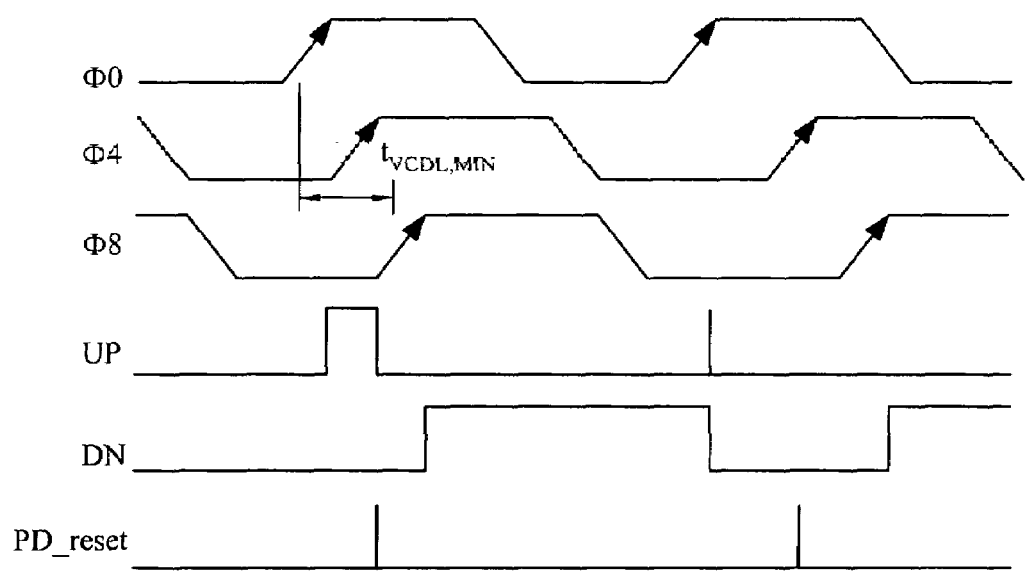
FIG. 8C illustrates various signals processed in accordance with an embodiment of the invention.

As shown in FIG. 6, the input CEM data is sampled by its own delayed version. So, the DLL can recover data even if the input clock has a large amount of jitter. To ensure enough lock range of the DLL, a phase detector 608 with false-lock detection may be used. FIG. 8A illustrates a phase detector 608 configured in accordance with an embodiment of the invention. If the initial delay of VCDL is larger than $2\times T_{CLK}$, i.e., the rising edge of the φ1 clock is located in the shaded area of FIG. 8(*b*), the coarse_up signal is asserted to prevent harmonic lock. On the other hand, when the initial delay is so small that the VCDL delay would be stuck to its minimum value, the PD_reset signal is asserted to deactivate the false up signal. This is accomplished by comparing rising edges of φ0 and φ4, as shown in FIG. 8(*c*). If the rising edge of φ4 is found between φ0 and φ8, the phase detector no longer generates an up signal, but makes the VCDL slow down.

The clock-edge modulated serial link of the invention has been fabricated in a standard 0.18 μm CMOS technology. The fabricated chip consumes 3.12 mW at 1.2 V supply voltage when operating at 270 Mb/s.

Those skilled in the art will appreciate that the invention may be implemented with various modifications. For example, the serial link may be augmented with multiple links to increase throughput. In addition, the invention can be utilized in a bidirectional (full-duplex) mode. Also, since differential mode signals are used, there is a common mode signal that may be used for other purposes. For example, the common mode signal may be used to exchange configuration data. The configuration data may specify such parameters as data format, data destination (when multiple transmitters/receivers are connected on the bus), data directionality, and the like.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A signal transmitter, comprising:
   a channel node to interface with a single direct current balanced differential channel; and
   circuitry connected to the channel node, the circuitry being configured to multiplex clock, data and control signals and apply them to the channel node, wherein the clock signal is pulse width modulated to incorporate direct current balancing control signals.

2. The signal transmitter of claim 1 wherein the circuitry is configured to specify a low direct current value at a first duty cycle position.

3. The signal transmitter of claim 2 wherein the circuitry is configured to specify a high direct current value at a second duty cycle position.

4. The signal transmitter of claim 3 wherein the circuitry is configured to specify a no change direct current value at a third duty cycle position.

5. The signal transmitter of claim 1 wherein the circuitry generates multiple phase signals.

6. The signal transmitter of claim 5 wherein the circuitry includes a multiplexer to process the multiple phase signals and serialized data.

7. The signal transmitter of claim 6 wherein the circuitry includes a voltage mode driver to process the output of the multiplexer.

8. A signal receiver, comprising:
   a channel node to interface with a channel configured as a single direct current balanced differential channel; and
   circuitry connected to the channel node, the circuitry configured to de-multiplex clock, data and control signals from the channel node, wherein the circuitry identifies direct current balancing control signals within a pulse width modulated clock signal.

9. The signal receiver of claim 8 wherein the circuitry includes an amplifier to process signals from the channel.

10. The signal receiver of claim 9 wherein the circuitry includes a delay-locked loop to process output from the amplifier.

11. The signal receiver of claim 10 wherein the delay-locked loop generates multiple phase signals for application to a pulse width modulated decoder.

12. The signal receiver of claim 11 wherein the delay-locked loop generates multiple phase signals for application to a phase detector.

13. A battery powered computing device, comprising:
    a channel configured as a single direct current balanced differential channel;
    a signal transmitter connected to the channel, the signal transmitter being configured to multiplex clock, data, and control signals, wherein the clock signal is pulse width modulated to incorporate direct current balancing control signals, the signal transmitter configured to apply the multiplexed signals to the channel; and
    a signal receiver connected to the channel, the signal receiver configured to de-multiplex the clock, data and control signals from the channel node, the signal receiver configured to identify and recover the direct current balancing control signals from the pulse width modulated clock signal.

14. The battery powered computing device of claim 13 wherein the signal transmitter includes a voltage-mode driver.

15. The battery powered computing device of claim 13 wherein the channel is terminated only at the signal receiver.

16. The battery powered computing device of claim 13 further comprising a graphics controller connected to the signal transmitter.

17. The battery powered computing device of claim 13 further comprising a display controller connected to the signal receiver.

18. The battery powered computing device of claim 13 wherein the signal transmitter and the signal receiver are configured to exchange configuration information using a common mode signal on the channel.

19. The battery powered computing device of claim 13 wherein the signal transmitter and the signal receiver are configured for bidirectional data transfers over the channel.

* * * * *

UNITED STATES PATENT AND TRADEMARK OFFICE
CERTIFICATE OF CORRECTION

| | | |
|---|---|---|
| PATENT NO. | : 7,627,044 B2 | Page 1 of 1 |
| APPLICATION NO. | : 11/264303 | |
| DATED | : December 1, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Second Day of November, 2010

David J. Kappos
*Director of the United States Patent and Trademark Office*